US009013651B2

(12) United States Patent
Jeon et al.

(10) Patent No.: US 9,013,651 B2
(45) Date of Patent: Apr. 21, 2015

(54) BACKLIGHT UNIT COMPRISING A SHEET GUIDE HAVING AN OPENING SURROUNDING EDGES OF A BOTTOM COVER, LIGHT SOURCES, AND A LIGHT SOURCE FIXING UNIT AND LIQUID CRYSTAL DISPLAY DEVICE USING THE SAME

(71) Applicant: LG Display Co., Ltd., Seoul (KR)

(72) Inventors: Hyeon-Ku Jeon, Paju-si (KR); Yong-Shin Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 13/705,958

(22) Filed: Dec. 5, 2012

(65) Prior Publication Data

US 2013/0235302 A1 Sep. 12, 2013

(30) Foreign Application Priority Data

Mar. 6, 2012 (KR) ........................ 10-2012-0022839

(51) Int. Cl.
*G02F 1/1333* (2006.01)
*G02F 1/1335* (2006.01)
*F21V 8/00* (2006.01)

(52) U.S. Cl.
CPC ........ *G02B 6/0011* (2013.01); *G02F 1/133606* (2013.01); *G02F 1/133308* (2013.01); *G02F 2001/133317* (2013.01); *G02F 2001/133322* (2013.01); *G02B 6/0088* (2013.01); *G02B 6/009* (2013.01)

(58) Field of Classification Search
USPC .............................................. 349/58, 61–65
See application file for complete search history.

(56) References Cited

U.S. PATENT DOCUMENTS

2005/0099604 A1 5/2005 Mizumaki et al.
2005/0151894 A1 7/2005 Katsuda et al.
(Continued)

FOREIGN PATENT DOCUMENTS

| CN | 101324723 A | 12/2008 |
| CN | 101750798 A | 6/2010 |
| CN | 102352986 A | 2/2012 |

(Continued)

OTHER PUBLICATIONS

Office Action issued in corresponding Japanese Patent Application No. 2012-250956, mailed Oct. 31, 2013, 3 pages.

(Continued)

*Primary Examiner* — Paul Lee
(74) *Attorney, Agent, or Firm* — Brinks Gilson & Lione

(57) ABSTRACT

Disclosed are a backlight unit, an assembly structure of which is modified to minimize the thickness of a bezel and to prevent optical defects, such as light leakage, and a liquid crystal display device using the backlight unit. The liquid crystal display device includes a liquid crystal panel, at least one light source fixing unit on which plural light sources are mounted and which is fixed to the inner side surface of a bottom cover, a diffusion plate receiving light from the plural light sources through a light entry plane and changing the progress direction of light into a forward direction, a sheet guide formed on the front surface of the bottom cover in a shape in which the inside of the sheet guide is opened, and plural optical sheets disposed on the sheet guide and separated from the diffusion plate to perpendicularly emit light from the diffusion plate.

12 Claims, 4 Drawing Sheets

(56) References Cited

U.S. PATENT DOCUMENTS

2010/0128198 A1* 5/2010 Kim et al. .................. 349/61
2012/0002130 A1   1/2012 Watanabe

FOREIGN PATENT DOCUMENTS

| | | |
|---|---|---|
| JP | 2001-249622 | 9/2001 |
| JP | 2005-158707 | 6/2005 |
| JP | 2010-113839 | 5/2010 |
| JP | 2010-128502 | 6/2010 |
| JP | 2012-014893 | 1/2012 |

OTHER PUBLICATIONS

Office Action and Search Report issued in Chinese Patent Application No. 201210491523.1, mailed Nov. 18, 2014, 21 pages.

* cited by examiner

BACKLIGHT UNIT COMPRISING A SHEET
GUIDE HAVING AN OPENING
SURROUNDING EDGES OF A BOTTOM
COVER, LIGHT SOURCES, AND A LIGHT
SOURCE FIXING UNIT AND LIQUID
CRYSTAL DISPLAY DEVICE USING THE
SAME

This application claims the benefit of Korean Patent Application No. 10-2012-0022839, filed on Mar. 6, 2012, which is hereby incorporated by reference as if fully set forth herein.

BACKGROUND

1. Field of the Disclosure

The present disclosure relates to a backlight unit, an assembly structure of which is modified to minimize the thickness of a bezel forming the external appearance of a liquid crystal display device and to prevent optical defects, such as light leakage, and a liquid crystal display device using the backlight unit.

2. Discussion of the Related Art

Recently, as flat panel display devices used in personal computers, portable terminals and monitors of various information equipment, liquid crystal display devices, plasma display devices, field emission display devices and light emitting display devices are on the rise.

In such a flat panel display device, a display panel displaying an image is seated on a separate guide bracket or panel guide, and is assembled with the inside of a front cover or a back cover forming the external appearance of the flat panel display device. Particularly, in the case of a liquid crystal display device, a liquid crystal panel itself cannot emit light, and thus a backlight unit is further provided on the rear surface of the liquid crystal panel and is assembled with a panel guide and a back cover.

In order to meet consumer' various demands for stylish design and the light-weight and thin-thickness trends, development of a liquid crystal display device which employs an edge type backlight unit including light sources formed of light emitting diodes to supply light on the side surface of the backlight unit and has the minimum thickness of a bezel is required.

In a conventional liquid crystal display device in which a front cover or a top case is formed in a designated size other than a thin bezel, a sufficient distance between a plurality of light sources and a diffusion plate to convert and diffuse an optical path from the respective light sources is obtained. Thus, optical defects due to diffusion sheets may be prevented even if the diffusion sheets are disposed directly on the diffusion plate. Particularly, when the sufficient distance between the plural light sources and the light diffusion plate is obtained, light leakage or formation of light beams generated by the rib shape of a prism sheet from among the diffusion sheets disposed directly on the diffusion plate may be prevented.

However, if the thin bezel is formed, a distance between the plural light sources and the diffusion plate is inevitably narrowed, and thus it may be impossible to prevent optical defects generated by the shape of diffusion sheets when the diffusion sheets are disposed directly on the diffusion plate. Particularly, when the sufficient distance between the respective light sources and the diffusion plate is not obtained due to the thin bezel, optical defects such as light beams or light leakage due to the rib shape of the prism sheet from among the diffusion sheets occur, thereby causing a defect in image display and greatly lowering product reliability. If the bezel surrounding the edge of the front surface or the frame of a liquid crystal panel has a thin thickness, a distance between plural light sources and a diffusion plate is inevitably narrowed. Thereby, when optical sheets are disposed directly on the diffusion plate, optical defects cannot be prevented by the shape of the diffusion sheets. Particularly, when the distance between respective light sources and the diffusion plate is not sufficiently secured by reducing the thickness of the bezel, optical defects due to the rib shape of the prism sheet from among the diffusion sheets occur and thus cause image display defects.

SUMMARY

A backlight unit includes a plurality of light sources generating light, at least one light source fixing unit on which the plurality of light sources is mounted and which is fixed to the inner side surface of a bottom cover, a diffusion plate receiving light incident from the plurality of light sources through a light entry plane formed on one side surface of the diffusion plate, changing the progress direction of light into a forward direction, and then emitting light in the forward direction, a sheet guide formed on the front surface of the bottom cover in a shape in which the inside of the sheet guide is opened to surround the edges of the front surfaces of the bottom cover, including the light source fixing unit, and the diffusion plate, and a plurality of optical sheets disposed on the sheet guide and separated from the diffusion plate to perpendicularly emit light from the diffusion plate.

In another aspect of the present invention, a liquid crystal display device includes a liquid crystal panel including a plurality of pixel areas to display an image, at least one light source fixing unit on which a plurality of light sources is mounted to irradiate light onto the liquid crystal panel and which is fixed to the inner side surface of a bottom cover, a diffusion plate receiving light incident from the plurality of light sources through a light entry plane formed on one side surface of the diffusion plate, changing the progress direction of light into a forward direction, and then emitting light in the forward direction, a sheet guide formed on the front surface of the bottom cover in a shape in which the inside of the sheet guide is opened to surround the edges of the front surfaces of the bottom cover, including the light source fixing unit, and the diffusion plate, and a plurality of optical sheets disposed on the sheet guide and separated from the diffusion plate to perpendicularly emit light from the diffusion plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DISCLOSURE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit and a liquid crystal display device using the same in accordance with one embodiment of the present invention will be described in more detail with reference to the accompanying drawings.

Figure 1:
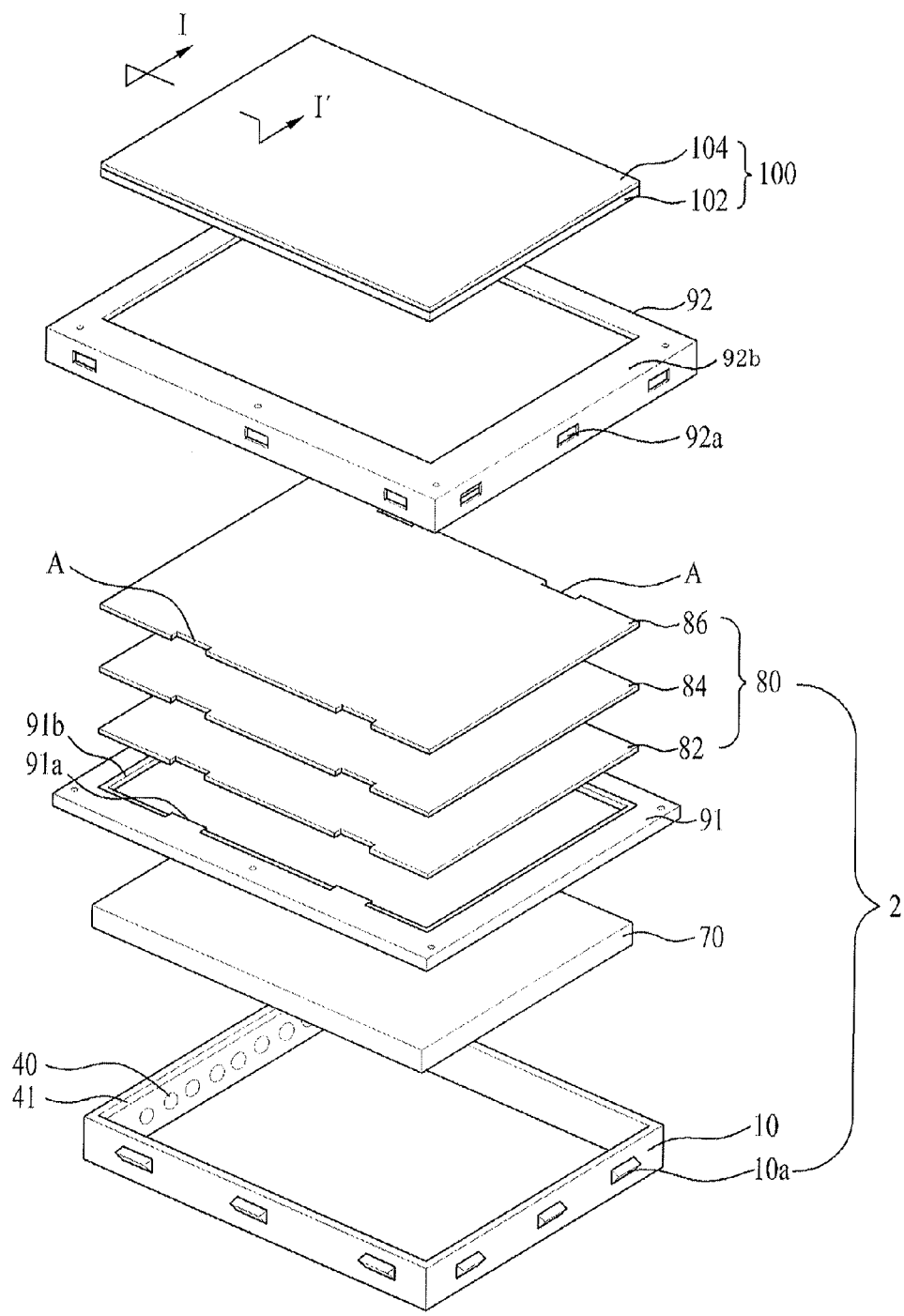
FIG. 1 is an exploded perspective view schematically illustrating a backlight unit and a liquid crystal display device using the same in accordance with one embodiment of the present invention.

FIG. 1 is an exploded perspective view schematically illustrating a backlight unit and a liquid crystal display device using the same in accordance with one embodiment of the present invention. Here, in the following, basically, the wording "front surface" of an element indicates the surface of the element at the side of a liquid crystal panel 100 in a direction from a bottom cover 10 to the liquid crystal display panel 100 in an assembled state of the liquid crystal display device; the wording "rear surface" of an element indicates the surface of the element at the side of the bottom cover 10 in a direction from the liquid crystal display panel 100 to the bottom cover; and the wording "side surface" of an element indicates the surface of the element in a direction perpendicular to a direction from the bottom cover 10 to a liquid crystal display panel 100.

The liquid crystal display device in accordance with the present invention shown in FIG. 1 includes a backlight unit 2, a panel guide 92, a liquid crystal panel 100 and a bezel (not shown).

The liquid crystal panel 100 in which the bezel is formed to have a thin thickness at the edge of the front surface of the liquid crystal panel 100 is attached to the front surface of the panel guide 92, and adjusts transmittance of light from the backlight unit 2 to display an image. For this purpose, the liquid crystal panel 100 includes a lower substrate 102, an upper substrate 104, liquid crystals (not shown) formed between the lower substrate 102 and the upper substrate 104, spacers (not shown) to maintain a regular interval between the lower substrate 102 and the upper substrate 104, lower polarizer 106 and upper polarizer 108.

The upper substrate 104 includes color filters of blue, red and green, a black matrix and a common electrode.

The lower substrate 102 includes thin film transistors respectively formed in cell areas defined by data lines and gate lines, and pixel electrodes connected to the thin film transistors. The thin film transistors transmit image signals, supplied from the data lines in response to gate-on voltages supplied from the gate lines to the pixel electrodes. Here, the common electrode provided on the upper substrate 104 may be formed on the lower substrate 102 according to modes of liquid crystals.

Further, data pad areas respectively connected to the data lines and gate pad areas respectively connected to the gate lines are provided in a non-display area of the lower substrate 102.

A plurality of data circuit films (not shown) on which a data integrated circuit to supply the image signal to the data lines is mounted is attached to the data pad areas. Each data circuit film may be a tape carrier package or a chip on film. The data circuit films supply a data signal from a data printed circuit board (not shown) to the data integrated circuit, and supplies the image signal output from the data integrated circuit to the respective data lines. The data integrated circuit may be mounted on the lower substrate 102 via a chip-on-glass method. In this case, the data integrated circuit mounted on the lower substrate 102 receives the data signal from the data printed circuit substrate through the data circuit films.

A plurality of gate circuit films (not shown) on which a gate integrated circuit to supply the gate-on voltage to the gate lines is mounted are attached to the gate pad areas. Each gate circuit film may be a tape carrier package or a chip on film. The gate circuit films supply a gate control signal, supplied from the data printed circuit board (not shown) through the data circuit films and the lower substrate 102, to the gate integrated circuit, and supply the gate-on voltage output from the gate integrated circuit to the respective gate lines. The gate integrated circuit may be mounted on the lower substrate 102 via a chip-on-glass method, or may be formed on the lower substrate 102 during a thin film transistor fabrication process.

The panel guide 92 is installed on the side surface of the bottom cover 10 by hooking fixing protrusions 10a to fixing grooves 92a so as to surround the side surface of the bottom cover 10 as well as to surround the entire edge of the front surface of the backlight unit 2. Such a panel guide 92 includes a panel support part 92b formed on the front surface thereof to support the edge of the rear surface of the liquid crystal panel 100. A double-sided adhesive member or an assembly member (not-shown) is formed on the front surface of the panel support part 92b so as to be attached or fixed to a non-display area of the rear surface of the liquid crystal panel 100. The Panel guide 92 has plural fixing grooves 92a whose numbers and locations correspond to those of fixing protrusions 10a formed on the outer side surface of the bottom cover 10. Further, the bezel which is not shown is formed so as to surround a non-display area of the front surface of the liquid crystal panel 100.

Figure 2:
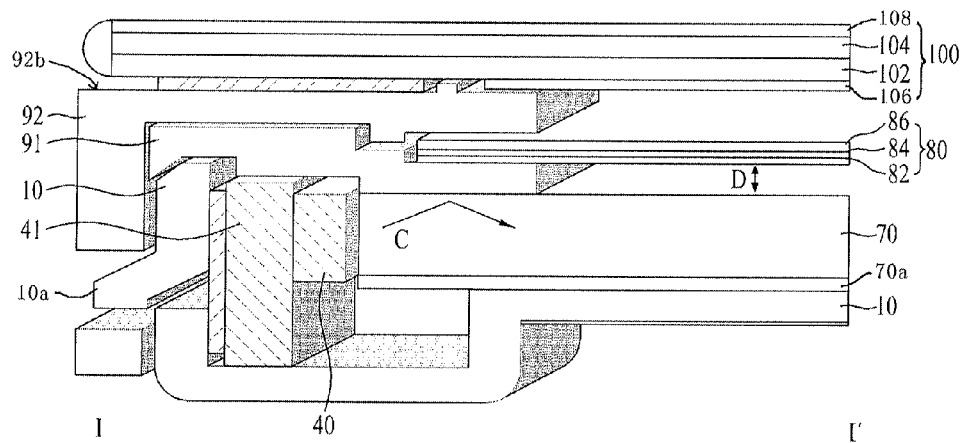
FIG. 2 is a perspective view illustrating a cross-section taken along the line I-I' of FIG. 1 in an assembled state.
Figure 3:
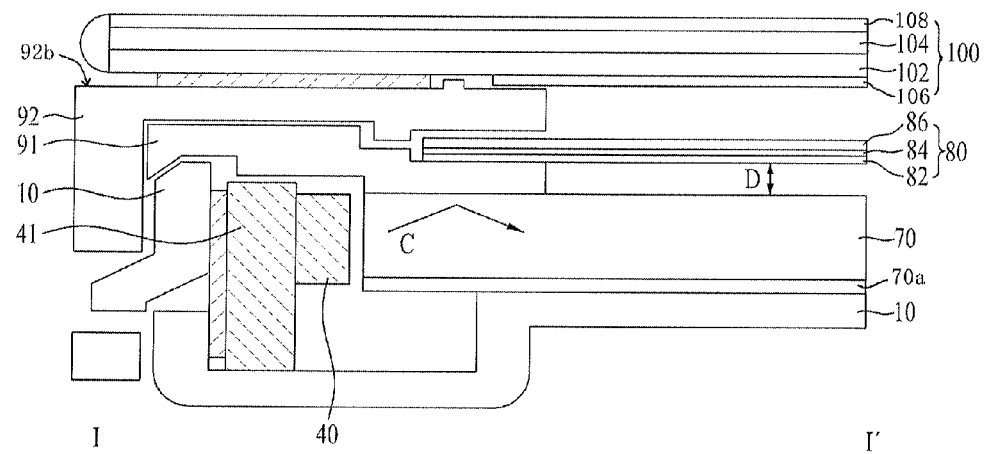
FIG. 3 is a sectional view illustrating the cross-section taken along the line I-I' of FIG. 1 in the assembled state.

FIG. 2 is a perspective view illustrating a cross-section taken along the line I-I' of FIG. 1 in an assembled state of the liquid crystal display device in accordance with an embodiment of the present invention, and FIG. 3 is a sectional view illustrating the cross-section taken along the line I-I' of FIG. 1 in the assembled state.

The backlight unit 2 shown in FIGS. 1 to 3 includes: a bottom cover 10 having plural fixing protrusions 10a on the outer side surface thereof; a plurality of light sources 40 generating light; a light source fixing unit 41 on which the plural light sources 40 are mounted and which is fixed to the inner side surface of the bottom cover 10; a diffusion plate 70 receiving light incident from the respective light sources 40 through a light entry plane formed on one side surface of the diffusion plate 70, changing the progress direction of light into a forward direction, and then emitting light in the forward direction to the liquid crystal display panel 100; a sheet guide 91 arranged on the front surface of the bottom cover 10 in a shape in which the inside of the sheet guide 91 is opened to surround the light source fixing unit 41 and the edges of the front surfaces of the bottom cover 10 and the diffusion plate 70; and a plurality of optical sheets 80 disposed on a sheet support part 91b of the sheet guide 91 and separated from the diffusion plate 70 to perpendicularly emit light from the diffusion plate 70.

As shown in FIGS. 1-3, the bottom cover 10 has a rectangular plate-like frame shape, and has a step wise shape in the peripheral part of the bottom cover 10 in which the peripheral part is lower than the central portion of the bottom cover 10 in the inside of the bottom cover 10. The central portion of the bottom cover 10 supports the rear surface of the diffusion plate 70. The light source fixing unit 41 on which the plurality of light sources 40 are mounted is fixed and arranged on one inner side surface of the bottom cover 10. Here, the light source fixing unit 41 may be fixed to at least one inner side surface of the bottom cover 10.

Each of the plural light sources 40 is detachably mounted on the light source fixing unit 41, and is located so as to be opposite the light entry plane formed on the side surface of the light diffusion plate 70. Here, light emitting diodes, such as white light emitting diodes, or red, green and blue light emitting diodes, a fluorescent light, or ultraviolet light emitting diodes may be used as the plural light sources 40. The respective plural light sources 40 are turned on by light source driving power supplied through the light source fixing unit 41, and thus irradiate light onto the light entry plane formed on the side surface of the diffusion plate 70.

The light source fixing unit 41 supplies light source driving power transmitted from an outside power supply to the plural light sources 40. That is, the light source fixing unit 41 may be a printed circuit board, and when the plural light sources 40 are mounted on the light source fixing unit 41, the light source fixing unit 41 supplies light source driving power, transmitted from the outside, to the plural light sources 40 through a pattern or wiring formed thereon.

The diffusion plate 70 is stacked on the central portion of the front surface of the bottom cover 10. Here, the light entry plane formed on the side surface of the light diffusion plate 70 is located opposite the light source fixing unit 41. Such a diffusion plate 70 changes the progress path of light irradiated from the respective light sources 40 towards the light entry plane, and diffuses the light towards the overall region of the rear surface of the light crystal panel 100. A reflective sheet 70a, as shown in FIGS. 2 and 3, is further provided on the rear surface of the diffusion plate 70, i.e., between the rear surface of the diffusion plate 70 and the front surface of the bottom cover 10, and reflects light emitted from the rear surface of the diffusion plate 70 back to the diffusion plate 70.

The sheet guide 91 has a rectangular flame shape whose inside is opened and is disposed at the edge of the front surface of the bottom cover 10 in the shape in which the inside of the sheet guide 91 is opened to surround the source fixing unit 41 and the edges of the front surfaces of the bottom cover 10 and the diffusion plate 70. The sheet guide 91 includes: the sheet support part 91b supporting the edge of the rear surface of an optical sheet 82 disposed at the rearmost position from among the respective optical sheets 80; sheet fixing parts AD fixing at least one optical sheet from among the respective optical sheets 80 by at least one adhesive member or at least one fixing member; and a plurality of protruding fixing parts 91a protruding on the sheet support part 91b to prevent movement of at least one optical sheet from among the respective optical sheets 80.

The sheet support part 91b is formed in a stepwise shape at the edge of an opening formed at the central portion of the sheet guide 91, and supports the edge of the rear surface of the optical sheet 82 disposed at the rearmost position from among the respective optical sheets 80 and the side surfaces of the respective optical sheets 80. Such a stepwise shape of the sheet support part 91b supports the side surfaces of the optical sheets seated on the sheet support part 91b, thereby preventing movement of the optical sheets 80 in the leftward and rightward direction or in the upward and downward direction. The sheet support part 91b is disposed on the edge of the front surface of the diffusion plate 70. Here, an adhesive member or a fixing member is further formed on the stepwise-shaped sheet support part 91b so as to fix at least one optical sheet 80 sequentially seated on the sheet support part 91b. Thereby, the respective optical sheets 80 are fixed under the condition that it is separated from the diffusion plate 70 by the thickness of the sheet guide 91 or a distance D between the sheet 82 at the rearmost position of the optical sheet 80 and the front surface of the diffusion plate 70.

The plural protruding fixing parts 91a may be further formed on the sheet support part 91b. The plural protruding fixing parts 91a are engaged with fixing grooves A formed on the respective optical sheets 80, thus preventing movement of the respective optical sheets 80.

The plural optical sheets 80 adjust an optical path such that incident light diffused by the diffusion sheet 70 is irradiated perpendicularly onto the liquid crystal panel 100. Here, the plural optical sheets 80 are sequentially stacked on the stepwise-shaped sheet support part 91b of the sheet guide 91, and are fixed onto the sheet support part 91b by fixing member element such a bond, a resin and an adhesive. These plural optical sheets 80 may include at least one prism sheet 82, a diffusion sheet 84, a polarization sheet 86 and a protective sheet (not shown) so as to converge the light diffused by the diffusion plate 70. Here, kinds of the stacked sheets or the order of the stacked sheets may be varied according to usage purposes of the backlight unit 10.

However, as shown in FIG. 3, when the plural optical sheets 80 are fixed to the sheet support part 91b of the sheet guide 91, which is separately provided, as shown in FIG. 3, the respective optical sheets 80 are separated from the diffusion sheet 70 by the thickness of the sheet guide 91 or the interval D between the sheet support part 91b and the diffusion plate 70, and thus light from the diffusion plate 70 cannot be transmitted directly to the optical sheets 80.

Figure 4:
FIG. 4 is a view illustrating light leakage prevention effects according to assembly structure change of optical sheets.

Further, light C incident through the light entry plate of the diffusion plate 70 does not directly enter the optical sheets 80 but is interrupted by the sheet guide 91, and thus light leakage or a degree of generation of light beams may be reduced, as shown in FIG. 4.

Figure 5:
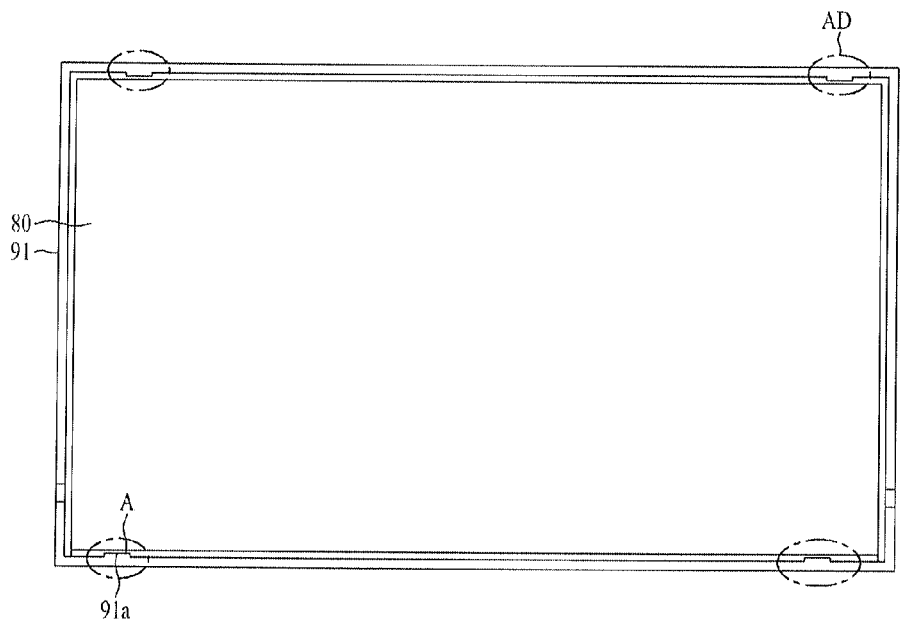
FIG. 5 is a plan view illustrating an optical sheet disposed on a sheet support part of a sheet guide.
Figure 6:
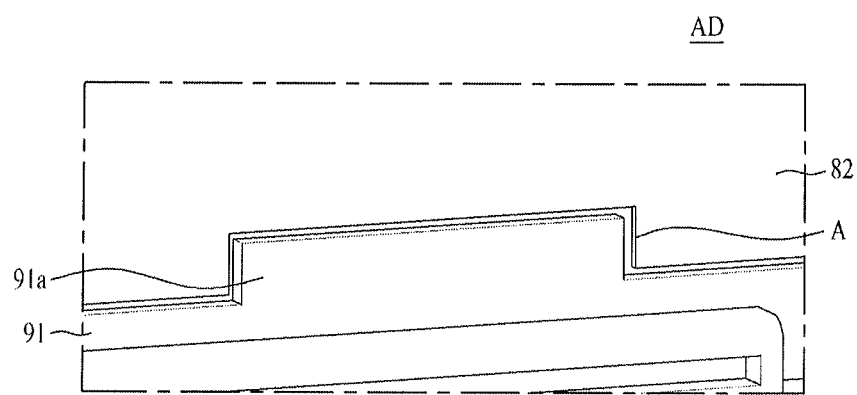
FIG. 6 is a view illustrating an optical sheet fixing part of FIG. 5 in detail.

FIG. 5 is a plan view illustrating an optical sheet disposed on the sheet support part 91b of the sheet guide, and FIG. 6 is a view illustrating the optical sheet fixing part AD of FIG. 5 in detail.

With reference to FIGS. 1, 5 and 6, the plural fixing grooves A having the same width as the respective protruding fixing parts 91a formed on the sheet support part 91b are formed on each optical sheet 80, and are engaged with the respective protruding fixing parts 91a on the sheet support part 91b. Thereby, the respective optical sheets 80 may be fixed to the sheet guide 91 by the sheet fixing parts AD and the protruding fixing parts 91a in addition to the stepwise-shaped sheet support part 91b.

A light source driving circuit unit (not shown) generating light source driving power to drive the respective light sources 40 is further provided on the backlight unit 2, and supplies light source driving power to the respective light sources 40 through the light source fixing unit 41. Here, the light source driving circuit unit includes at least one inverter or switching circuits, and generates light source driving power by converting external power input as AC power into DC power. Further, the generated light source driving power is supplied to the respective light sources 40 according to driving timing of the liquid crystal panel 100, etc. As described above, by turning the plural light sources 40 on using the light source driving power supplied from the light source driving circuit unit, the backlight unit 2 generates light and irradiates the light onto the liquid crystal panel 100.

As is apparent from the above description, a backlight unit and a liquid crystal display device using the same in accordance with the present invention improve an assembly structure of the backlight unit 2, particularly, an assembly structure of optical sheets 80 using a sheet guide 91, thereby preventing optical defects, such as light leakage. Further, since the assembly structure of the optical sheets 80 using the sheet guide 91 prevents optical defects of the backlight unit, the thickness of a bezel forming the external appearance of the liquid crystal display device may have minimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a plurality of light sources that generate light;
   at least one light source fixing unit on which the plurality of light sources is mounted and which is fixed to the inner side surface of a bottom cover;
   a diffusion plate receiving light incident from the plurality of light sources through a light entry plane formed on one side surface of the diffusion plate, changing the progress direction of light into a forward direction, and then emitting light in the forward direction;
   a sheet guide disposed on the front surface of the bottom cover and the edge of the diffusion plate in a shape in which the inside of the sheet guide is opened to surround the edges of the front surfaces of the bottom cover, the light sources and the light source fixing unit; and
   a plurality of optical sheets disposed on the sheet guide and separated from the diffusion plate to perpendicularly emit light from the diffusion plate.

2. The backlight unit according to claim 1, wherein the sheet guide includes:
   a sheet support part supporting the edge of the rear surface of an optical sheet disposed at the rearmost position from among the plurality of optical sheets, on the front surface thereof;
   protruding fixing parts that protrude on the sheet support part to prevent movement of at least one optical sheet from among the plurality of optical sheets.

3. The backlight unit according to claim 2, wherein the sheet support part is formed in a stepwise shape at the edge of an opening formed at the central portion of the sheet guide, and supports the edge of the rear surface of the optical sheet disposed at the rearmost position from among the plurality of optical sheets and the side surfaces of the respective optical sheets.

4. The backlight unit according to claim 1, wherein each of the plurality of optical sheets is separated from the diffusion plate by the thickness of the sheet guide or an interval between the sheet support part and the diffusion plate, and is fixed to the sheet support part.

5. The backlight unit according to claim 2, wherein a plurality of fixing grooves having the same width as the plurality of protruding fixing parts formed on the sheet support part is formed on each of the plurality of optical sheets, and is engaged with the plurality of protruding fixing parts on the sheet support part.

6. The backlight unit according to claim 2, further comprising sheet fixing parts fixing at least one optical sheet from among the plurality of optical sheets to the sheet support part by at least one adhesive member or at least one fixing member.

7. A liquid crystal display device comprising:
   a liquid crystal panel including a plurality of pixel areas to display an image;
   at least one light source fixing unit on which a plurality of light sources is mounted to irradiate light onto the liquid crystal panel and which is fixed to the inner side surface of a bottom cover;
   a diffusion plate receiving light incident from the plurality of light sources through a light entry plane formed on one side surface of the diffusion plate, changing the progress direction of light into a forward direction, and then emitting light in the forward direction;
   a sheet guide disposed on the front surface of the bottom cover and the edge of the diffusion plate in a shape in which the inside of the sheet guide is opened to surround the edges of the front surfaces of the bottom cover, the light sources and the light source fixing unit
   a plurality of optical sheets disposed on the sheet guide and separated from the diffusion plate to perpendicularly emit light from the diffusion plate.

8. The liquid crystal display device according to claim 7, wherein the sheet guide includes:
   a sheet support part that supports the edge of the rear surface of an optical sheet disposed at the rearmost position from among the plurality of optical sheets, on the front surface thereof;
   and
   protruding fixing parts that protrude on the sheet support part to prevent movement of at least one optical sheet from among the plurality of optical sheets.

9. The liquid crystal display device according to claim 8, wherein the sheet support part is formed in a stepwise shape at the edge of an opening formed at the central portion of the sheet guide, and supports the edge of the rear surface of the optical sheet disposed at the rearmost position from among the plurality of optical sheets and the side surfaces of the respective optical sheets.

10. The liquid crystal display device according to claim 9, wherein:
    each of the plurality of optical sheets is separated from the diffusion plate by the thickness of the sheet guide or an interval between the sheet support part and the diffusion plate, and is fixed to the sheet support part; and
    a plurality of fixing grooves having the same width as the plurality of protruding fixing parts formed on the sheet support part is formed on each of the plurality of optical sheets, and is engaged with the plurality of protruding fixing parts on the sheet support part.

11. The liquid crystal display device according to claim 10, further comprising:
    a panel guide disposed on the front surface of the sheet guide so that the liquid crystal panel is seated on the panel guide.

12. The liquid crystal device according to claim 11, wherein a plurality of fixing holes are formed on the side surface of the panel guide;
    a plurality of fixing protrusions are formed on the outer side surface of the bottom cover;
    wherein the number and location of the fixing holes correspond to the number and location of the fixing protrusions, respectively, and wherein the fixing holes of the panel guide and the fixing protrusions of the bottom cover couple with each other.

* * * * *